United States Patent
Shirley

(10) Patent No.: US 11,385,741 B2
(45) Date of Patent: Jul. 12, 2022

(54) METHOD TO REDUCE BLANKING AREA FOR PALM REJECTION IN LOW COST IN-CELL DISPLAYS

(71) Applicant: Microsoft Technology Licensing, LLC, Redmond, WA (US)

(72) Inventor: Timothy C. Shirley, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/007,986

(22) Filed: Aug. 31, 2020

(65) Prior Publication Data
US 2022/0066614 A1   Mar. 3, 2022

(51) Int. Cl.
*G06F 3/041* (2006.01)

(52) U.S. Cl.
CPC ........ *G06F 3/04186* (2019.05); *G06F 3/0412* (2013.01); *G06F 2203/04105* (2013.01)

(58) Field of Classification Search
CPC ............................ G06F 3/04186; G06F 3/0412
See application file for complete search history.

(56) References Cited

U.S. PATENT DOCUMENTS

| 9,612,685 | B2* | 4/2017 | Ribeiro | G06F 3/0418 |
| 9,804,707 | B2* | 10/2017 | Durojaiye | G06F 3/0488 |
| 10,126,854 | B2 | 11/2018 | Johansson et al. | |
| 10,152,173 | B2* | 12/2018 | Qu | G06F 3/04186 |
| 2006/0109252 | A1* | 5/2006 | Kolmykov-Zotov | G06F 3/04186 345/173 |
| 2007/0285404 | A1 | 12/2007 | Rimon et al. | |
| 2013/0147752 | A1* | 6/2013 | Simmons | G06F 3/0443 345/174 |
| 2013/0257777 | A1* | 10/2013 | Benko | G06F 3/0346 345/173 |

(Continued)

OTHER PUBLICATIONS

"Displax Skin Ultra", Retrieved from: https://www.interactive-displays.de/download/treiber/displax/DISPLAX-Skin-Ultra-User-Guide-MKT.253.4.pdf, Retrieved Date: Jun. 19, 2020, pp. 1-90.

(Continued)

*Primary Examiner* — Chun-Nan Lin
(74) *Attorney, Agent, or Firm* — Fiala & Weaver P.L.L.C.

(57) ABSTRACT

Methods and systems are provided for receiving touch intensity signals from touch sensors of a touch screen. A spatial pattern in the touch intensity signals may indicate a deformation contour in the touch screen. A palm touch region is detected by comparing magnitudes of the touch intensity signals to a first touch-detection threshold. A second touch-detection threshold is assigned to a first perimeter region surrounding the palm touch region. The second touch-detection threshold may be a constant value or may vary over the first perimeter region of the touch screen. The second touch detection threshold may be determined by adjusting the first detection threshold. The second touch-detection threshold may be based on a slope of the touch intensity signals. The second touch-detection threshold provides a margin for reducing false touch signals near the palm touch region. The first touch-detection threshold is assigned to a region outside the first perimeter region.

20 Claims, 7 Drawing Sheets

(56) References Cited

U.S. PATENT DOCUMENTS

| | | | |
|---|---|---|---|
| 2013/0265271 A1 | 10/2013 | Hsu et al. | |
| 2013/0300672 A1 | 11/2013 | Griffin | |
| 2014/0104193 A1 | 4/2014 | Davidson et al. | |
| 2015/0338984 A1* | 11/2015 | Hunt | G06F 1/3231 |
| | | | 345/173 |
| 2015/0363034 A1* | 12/2015 | Hinckley | G06F 3/017 |
| | | | 345/173 |
| 2016/0179250 A1 | 6/2016 | Nakajima et al. | |
| 2017/0277320 A1* | 9/2017 | Choi | G06F 3/0446 |
| 2018/0059865 A1* | 3/2018 | Qu | G06F 3/017 |
| 2018/0095588 A1* | 4/2018 | Klein | G09B 21/004 |
| 2019/0294296 A1* | 9/2019 | Zhang | G06F 3/0488 |
| 2019/0346985 A1* | 11/2019 | Roard | G06F 3/04883 |

OTHER PUBLICATIONS

"ShadowSense White Paper: Palm Detection and Rejection", in ShadowSense White Paper, Retrieved Date: Jun. 19, 2020, 3 Pages.
Annett, et al., "Exploring and Understanding Unintended Touch during Direct Pen Interaction", in Journal of ACM transactions on Computer-Human Interaction, vol. 21, Issue 5, Nov. 2014, 39 pages.
"International Search Report and Written Opinion Issued in PCT Application No. PCT/US21/035056", dated Sep. 14, 2021, 13 Pages.
Yoshida, et al., "An 87x49 Mutual Capacitance Touch Sensing IC Enabling 0.5 mm-Diameter Stylus Signal Detection at 240 Hz-Reporting-Rate with Palm Rejection", In Proceedings of Asian Solid-State Circuits Conference, Nov. 10, 2014, pp. 217-220.

* cited by examiner

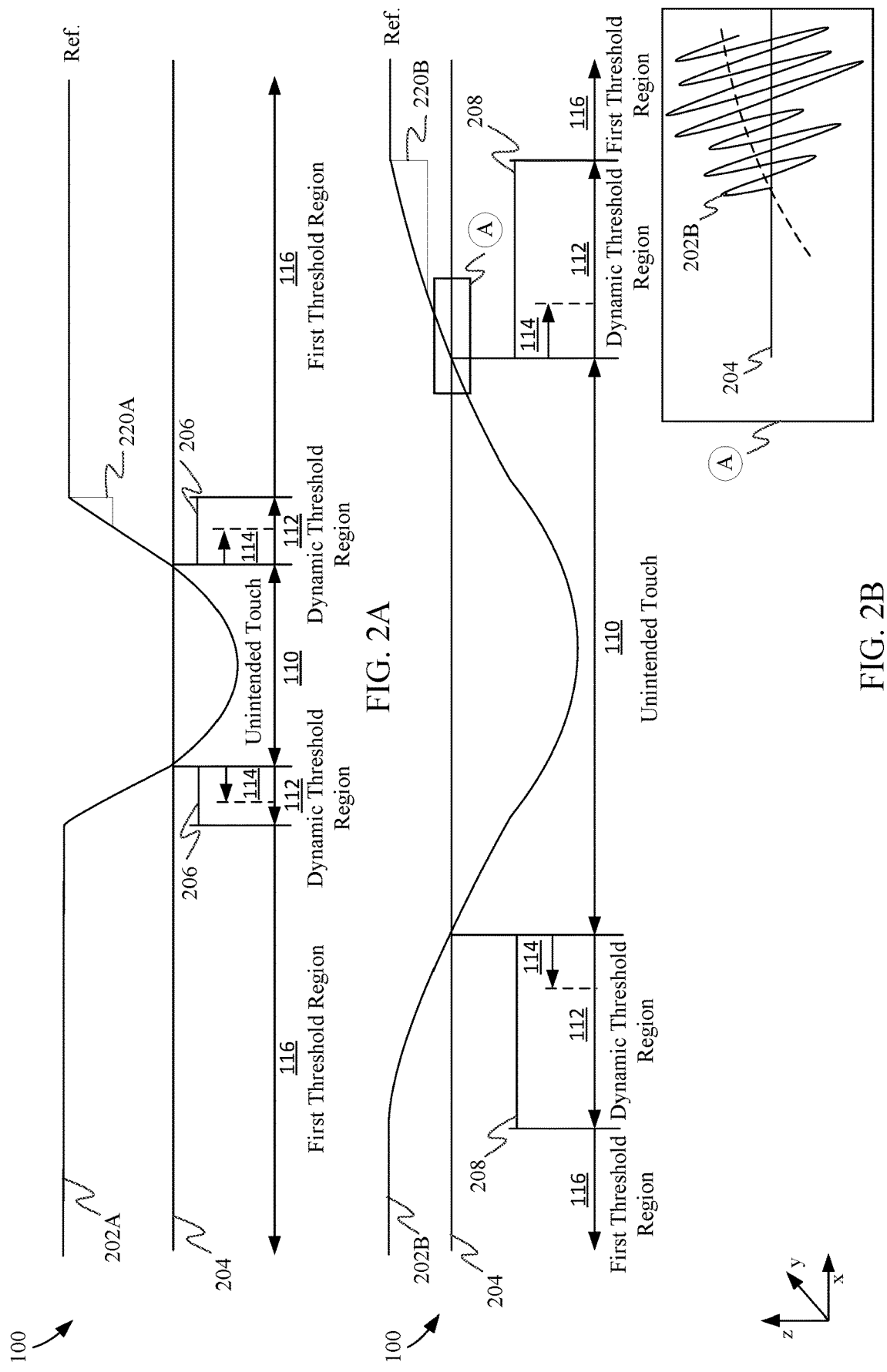

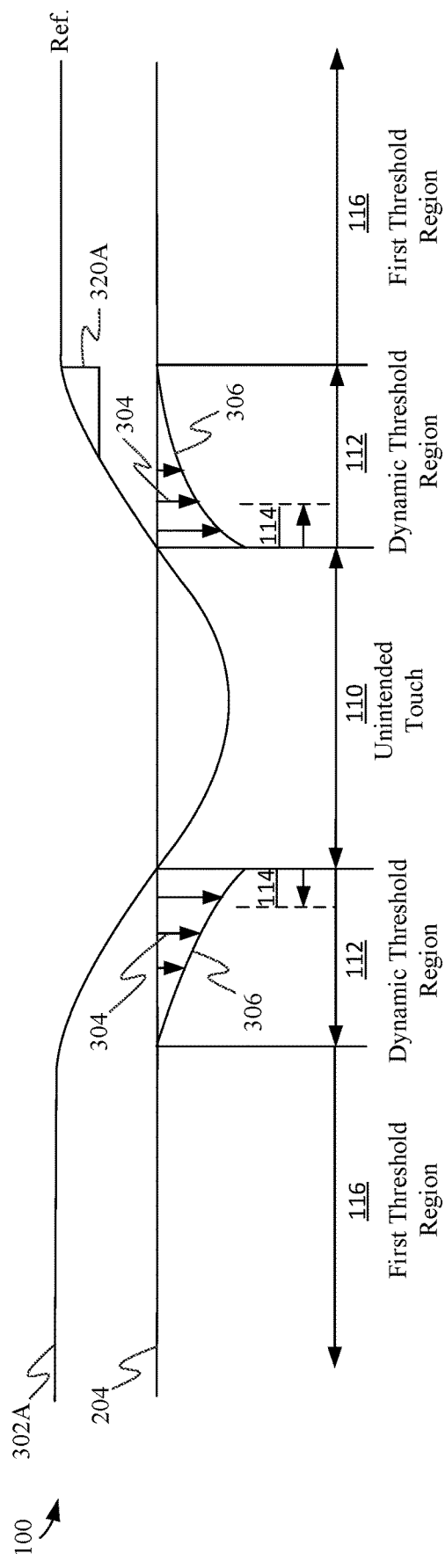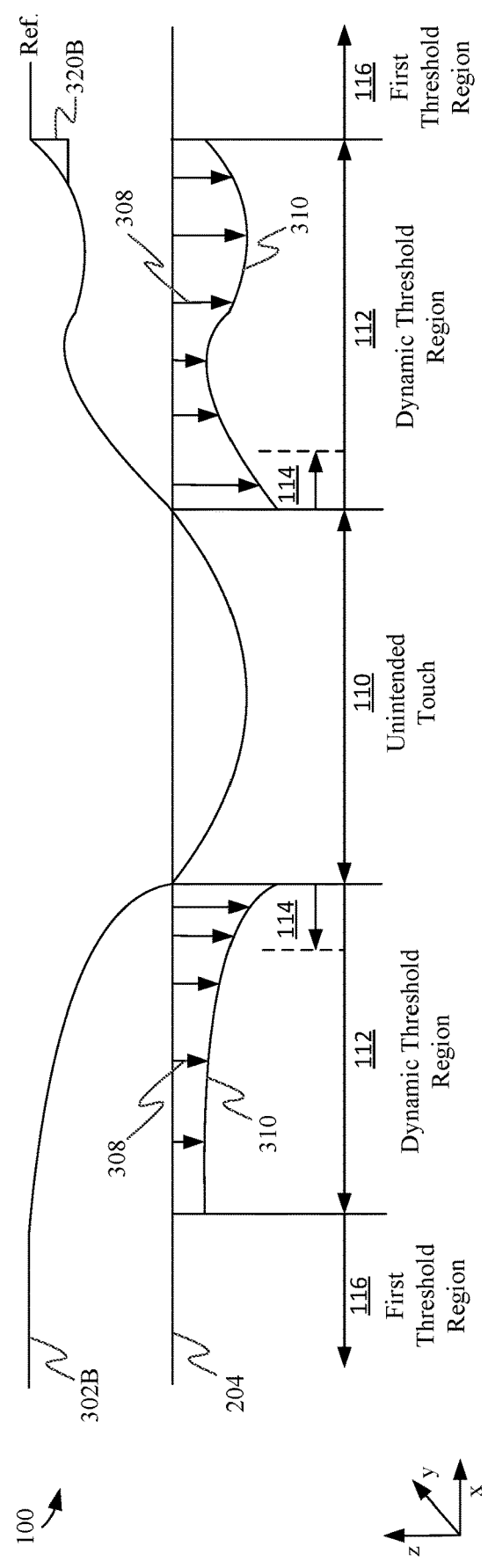
FIG. 3A
FIG. 3B

METHOD TO REDUCE BLANKING AREA FOR PALM REJECTION IN LOW COST IN-CELL DISPLAYS

BACKGROUND

Low-cost in-cell touch display modules (TDMs) may have LCD and touch sensing layers integrated in a single unit. These units tend to have relatively large touch electrodes which may cause high touch sensitivity. For example, noise may be generated in touch detection signals due to deformation of the TDM, which reduces the gap between the thin film transistors (TFTs) and the backlight backplane. When a palm is applied to the touch screen with a heavy force, the TDM may deform, and the displaced touch electrodes may cause "false" signals or "ghost" touches to be detected around the area of the palm.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided in a device that has a touch screen. A touch detector is configured to receive touch intensity signals from a two-dimensional (2D) spatial array of touch sensors of the touch screen. Magnitudes of the touch intensity signals correspond to at least a three-dimensional (3D) deformation contour in the touch screen. The touch detector is further configured to detect, based on a comparison of the magnitudes of the touch intensity signals to a first touch-detection threshold, a touched region of the touch screen. An unintended touch region determiner is configured to determine that the touched region of the touch screen corresponds to an unintended touched region. A second touch-detection threshold generator is configured to assign a second touch-detection threshold to a first perimeter region of the touch screen that surrounds the touched region.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 2A and 2B each show a schematic diagram of detected touch sensor signals and dynamic threshold regions relative to a cross section of the touch screen shown in FIG. 1, according to an example embodiment.

FIGS. 3A and 3B each include a schematic diagram of detected touch sensor signals and dynamic threshold regions relative to a cross section of the touch screen shown in FIG. 1, according to an example embodiment.

Figure 1:
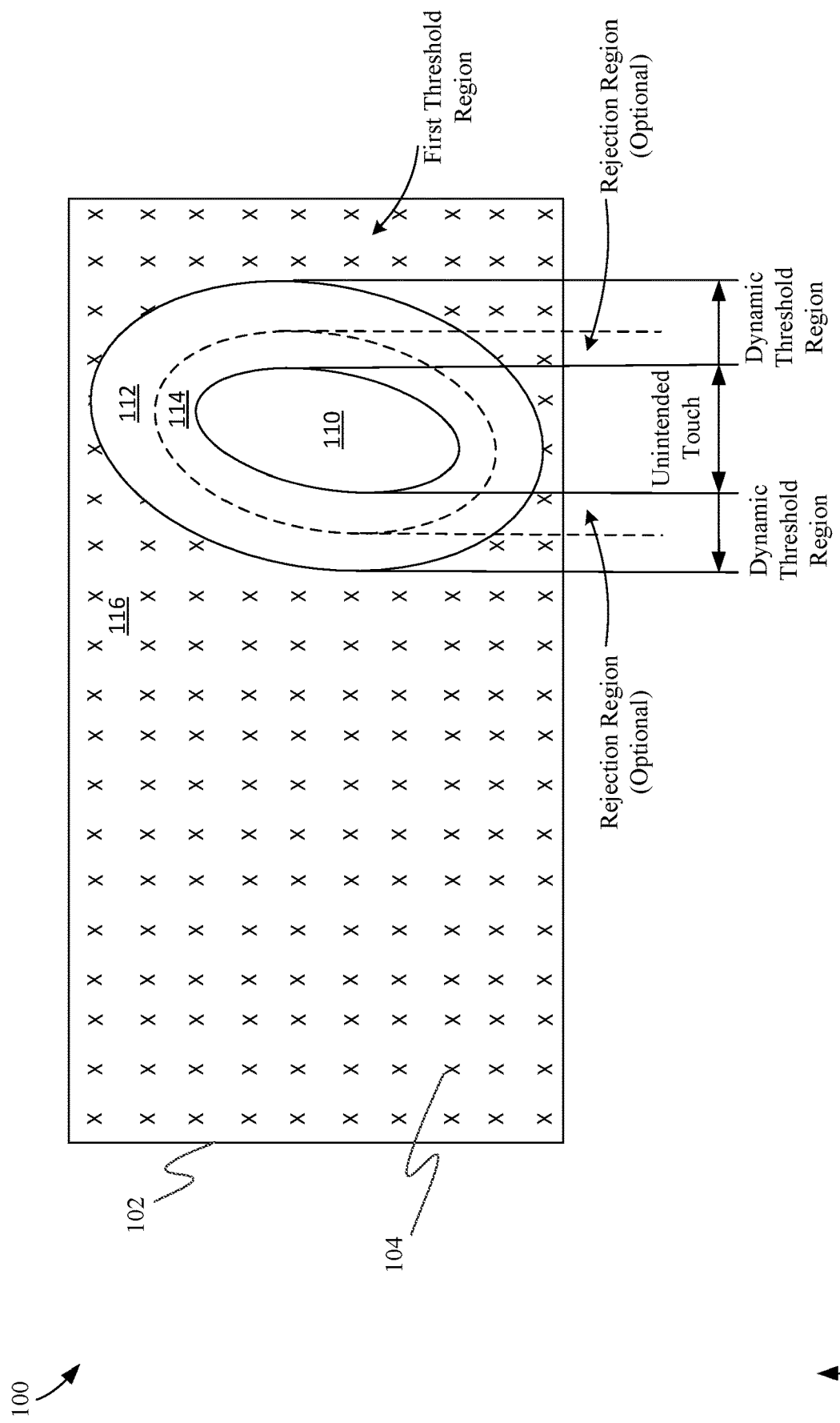
FIG. 1 is a diagram of touch screen of a touch screen display system configured to detect an unintended touch region (e.g., a palm touch) and generate a dynamic threshold region relative to the surface of the touch screen, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

1. Overview

Many of today's personal computing devices have touch screen displays, such that a user may provide input using the touch of a finger or a stylus (i.e., a pen). For example, a user may write with a stylus on a notepad computer touch screen or select a graphical element in a webpage with a finger touch to the screen. Similar to a user writing with pen and paper, a user writing with a stylus on a touch screen may rest the palm of their writing hand on the screen as they write, which may be detected by touch screen software (e.g., touch controller software). By analyzing the characteristics of detected touch signals, a computing device may decide which touch signals to disregard (or reject) as an unintended touch, such as a palm touch, and which signals to process as a user's intentional input to a software application. Often, to reduce detection of ghost touch signals around the area of a detected palm touch, a large touch rejection area (i.e., a blanking area) is created surrounding the detected palm touch. Within the touch rejection area, any detected touch signals are ignored. However, having such a large touch rejection area may unnecessarily reduce the area of the screen available for detecting intentional touch input, and thereby impair performance of the touch screen.

A touch screen display may include an array of touch sensors distributed across the length and width of the screen. When viewed in cross section, the touch screen display may have a stack of various layers of hardware that operate to display an image on the screen and detect touch input. In one example, the lowest layer of the stack may include a ground plane. Above the ground plane, the stack may include, among other things, a backlight followed by a polarizer and then a matrix of thin film transistors (TFTs) deposited on a glass substrate with pixel electrodes. Layers above the TFT layer may include liquid crystal, a color filter, another polarizer, and a cover glass. When power is not applied to the screen, the liquid crystals may twist to align with the above polarizer and light from the backlight may illuminate the screen. As power is increasingly applied, the liquid crystals align with the electric field turning perpendicular to the polarizer, allowing less and less light from the back light to pass through the above polarizer to darken the screen.

An array of touch sensors may be located within or near the TFT layer and may be spatially distributed in a grid pattern throughout the length and width of the display screen. A touch sensor may generate a touch signal in response to a conducting screen touch (e.g., finger touch, stylus touch, palm touch, etc.) located at the location of the touch sensor. For example, the conducting screen touch may be determined by a change in capacitance (different magnitude or intensity) from the baseline level at a touch sensor. When the magnitude of one or more received signal strengths from one or more touch sensors crosses a threshold level, a touch is detected at the location of the touch sensors activated by the physical touch on the screen. Touch sensing software may be configured to analyze detected touch signals and recognize a palm touch (e.g., vs a finger or stylus touch) based on shape and/or size of the detected touch signals. Where a screen touch is applied with a greater force, the TDM may deform. The deformation may add "noise" to the received touch signals and may broaden the detected area of touch on the screen. For example, with a heavy touch (e.g., a strong palm and/or arm touch) the screen may become deformed downward into the stack. The deformation may change the proximity of the touch sensors to the backlight ground plane (i.e., moving sensors closer to the ground plane) causing increased signal levels in the deformed area and the detection of false touches. The increased signal levels may be in addition to the conductive touch related signal, and may come from the same or additional sensors around the conductive touch.

FIG. 1 is a diagram of system 100 comprising a touch screen display configured to detect an unintended touch region (e.g., associated with a palm touch) and generate a dynamic touch-detection threshold region relative to the surface of the touch screen, according to an example embodiment. As shown in FIG. 1, system 100 includes a touch screen 102, touch sensors 104, an unintended touch region 110, a dynamic touch-detection threshold region 112, a rejection region 114, and a first touch-detection threshold region 116. These features of system 100 are described in further detail as follows.

FIG. 1 is a top surface view of touch screen 102. Touch screen 102 includes touch sensors 104. Touch sensors 104 may comprise a 2D array of touch sensors (e.g., touch electrodes, which may be resistive, capacitive, or other type) that may be spatially distributed in a grid pattern throughout the length and width of touch screen 102. Touch sensors 104 may be referred to as touch electrodes, or an array or grid of touch sensors or touch electrodes. As described above, an array of touch sensors, such as touch sensors 104, may be located within or near a layer of TFTs in a stack (not shown) of touch screen 102. When a physical touch is applied to touch screen 102 (e.g., a finger touch, palm touch, stylus touch, etc.), one or more touch detection signals is received by a touch sensing software of system 100 (described below) via one or more respective touch sensors 104 that are located where the physical touch was applied to the touch screen 102. A touch pattern is detected that corresponds to the touched area of the screen surface.

A stronger force applied to touch screen 102 by a physical touch results in a broader (e.g., wider) deformation of touch screen 102 than from a weaker force touch. The broader area of deformation may extend beyond the surface area of detected physical contact with touch screen 102 (e.g., beyond physical contact between a palm of a hand and touch screen 102). The broad deformation may cause noise or ghost touches in an area surrounding the area of detected physical contact. For example, as touch pressure increases, touch screen 102 and touch electrodes 104 move closer to the ground plane (not shown) of touch screen 102, which may contribute to a noisy signal, and thus, ghost touch signals around the area of actual physical contact with the touch screen.

In some embodiments, a touch signal received from an activated touch electrode 104 may correspond with the location of the activated electrode in touch screen 102. When received signal strengths from one or more touch electrodes 104 crosses a touch-detection threshold, a touch may be detected at the location of the activated electrodes.

As described above, as applied force increases on touch screen 102, screen deformation may become wider around the detected unintended touch region 110 (e.g., a palm touch 110), the wide screen deformation may cause increased sensitivity and the detection of noise as "ghost" touches around the unintended touched region 110. In the case of a strong palm touch, the surface area where ghost touches occur may extend well beyond the actual physical contact area of the user's palm with touch screen 102. This effect of extending the effective touched area may be more pronounced when larger touch electrodes are used, such as those used in some kinds of in-cell screen technology.

Unintended touch region 110 may comprise the surface area of a detected touch located on touch screen 102, which is caused by, for example, a palm touch and/or an arm touch (e.g., vs a finger or stylus touch), and may be referred to as palm touch area 110. In one embodiment, touch sensing software of system 100 (described in more detail below) may be configured to recognize unintended touch region 110 as a palm touch based on the size and/or shape of the detected touch area on the screen, or characteristics of screen deformation (e.g., slope). For example, the contact area of a palm touching touch screen 102 may have dimensions of a known range and/or recognizable shape(s) (e.g., an oval or elliptical shape, dimensions around 4 centimeters by 2 centimeters or other suitable dimensions, etc.). The touch sensing software of system 100 may be configured to reject or ignore signals from palm touch area 110 as being an unintended touch or as comprising irrelevant input to the system 100. Although FIG. 1 illustrates the 2D shape or boundary of unintended touch region 110, which is parallel to the surface of touch screen 102, the magnitudes of various touch intensity signals received via one or more of touch sensors 114 may provide information indicating a three-dimensional (3D) form of unintended touch region 110, where the 3D form extends into the depth of touch screen 102 (see FIGS. 2A and 2B and FIGS. 3A and 3B). The 3D form of unintended touch region 110 may correspond, to some degree, to the 3D form of a palm and/or arm that touches and deforms touch screen 102. The width of the 3D form may depend on the amount of force applied (i.e., palm strength) to the surface of touch screen 102.

In general, since the effective surface area of a detected palm touch may vary in size depending on the amount of pressure applied to a touch screen, the touch sensing software may throw away touch signals that are detected around the detected palm touch area, as these nearby touches may simply be caused by a variation in pressure of the palm (i.e., false touches or ghost touches). For example, some systems may be configured to block-out a shape of a pre-determined added dimension around the detected palm touch on the screen, and designate the blocked-out shape as a rejection area (i.e., dead zone). In one example, a 5 cm extension may be added around the surface area of a detected palm touch area as a rejection area. Any touch detection signals received from touch sensors within the rejection area will be ignored or discarded by the touch sensing software. In such systems, the dimensions of the rejection area may consume a large portion of the touch screen and may significantly reduce the surface area available for intended touch input. If a user touches the screen within the large extended rejection area, intending to provide input to a software application, the touch sensing software will ignore the intended input. Systems with larger touch electrodes may have increased sensitivity, and as a result, users (e.g., developers, administrators, etc.) may configure a pre-determined dimension to add surrounding a detected palm touch on the screen, to create a large touch rejection area.

The present disclosure provides methods and systems for reducing or eliminating the detection of false or "ghost" touches in touch screen 102 around detected oversized touch region 110, while improving or increasing the sensitive area of touch screen 102 where intended touches may be detected and utilized by touch sensing software of system 100 (e.g., rather than being ignored or discarded in a touch rejection region). Referring to FIG. 1, unintended touch region 110 is surrounded by dynamic touch-detection threshold region 112. Dynamic touch-detection threshold region 112 is an area where a touch-detection threshold level may be dynamically determined based on characteristics of the shape or contour of deformation of touch screen 102 that is caused by force of an applied physical touch. The shape or contour of screen deformation may correspond to the magnitude of touch signal levels (i.e., touch intensity signals) received from one or more touch sensors 104 that are activated in the 2D spatial array by a physical touch to screen 102. The shape or contour of the screen deformation may comprise a 3D form extending into or through the depth of touch screen 102 from the screen surface. All or a portion of the received touch signals that correspond to the deformation of touch screen 102 may be utilized to determine the dynamic touch-detection threshold used within the dynamic touch-detection threshold region 112 for detecting touches. The touch-detection threshold level that is used within dynamic touch-detection threshold region 112 may be a constant value or may be variable over the dynamic touch-detection threshold region 112. Outside of dynamic touch-detection threshold region 112, in first touch-detection threshold region 116, another touch-detection threshold may be used for detecting a touch. For example, the touch-detection threshold that is utilized to detect unintended touch region 110 may also be utilized in first touch-detection threshold region 116. In other words, in some embodiments, there are two touch-detection thresholds, one is used in the dynamic touch-detection threshold region 112 and another is used elsewhere in touch screen 102. Utilizing a dynamic or variable touch-detection threshold region 112 within a perimeter area surrounding the outer perimeter of a detected palm touch, as opposed to enforcing a large blanking area surrounding a detected palm touch, improves the performance of touch detection. For example, it allows for touch sensitivity in a greater area of the touch screen while mitigating the false touch signals often detected around a palm touch applied with a screen deforming force. In some embodiments, an optional fourth region (e.g., rejection region 114) may be defined on touch screen 102 between unintended touch region 110 and dynamic touch-detection threshold region 112. As shown in FIG. 1, optional rejection region 114, if utilized, is smaller than, and interior to, dynamic touch-detection region 112. Rejection region 114 may comprise a rejection region of a specified dimension where touch signals are rejected or ignored regardless of the value of a touch-detection threshold. Dynamic touch-detection region 112 may be referred to as a first perimeter region of touch screen 102 and rejection region 114 may be referred to as a second perimeter region of touch screen 102.

Although unintended touch region 110, dynamic touch-detection threshold region 112, and rejection region 114 are each shown as having an oval shaped boundary as viewed from above touch screen 102, the disclosure is not limited in this regard, and unintended touch region 110, dynamic touch-detection threshold region 112, and rejection region 114 may each have any suitable regular or irregular 2D shape across touch screen 102, and each of the shapes may be the same or different. Furthermore, detected unintended touch region 110 may comprise one or more shapes that together may be recognized by touch sensing software of system 100 as a user's palm and/or a portion of the user's arm, for example. However, the disclosure is not limited to unintended touch regions recognized as a palm touch, and other suitable shapes may be recognized as an unintended touch region 110.

Embodiments for generating a dynamic touch-detection threshold region may be implemented in various ways. For example, FIGS. 2A and 2B each include a schematic diagram of detected touch sensor signals and a dynamic touch-detection threshold region relative to a cross section of the touch screen of system 100 of FIG. 1, according to an example embodiment.

As shown in FIGS. 2A and 2B, system 100 includes unintended touch region 110 (e.g., a palm touch region), dynamic touch-detection threshold region 112, rejection region 114, first touch-detection threshold region 116, and a first touch-detection threshold 204. FIG. 2A also includes touch intensity signals 202A, a second touch-detection threshold 206, and a touch intensity signal slope 220A. FIG. 2B includes touch intensity signals 202B, a second touch-detection threshold 208, and a touch intensity signal slope 220B. Also shown in FIG. 2B is an enlarged section "A" including a detail of FIG. 2B.

As a preliminary note, referring to each of FIGS. 2A and 2B (and also to FIGS. 3A and 3B described below), unintended touch region 110, dynamic touch-detection threshold region 112, rejection region 114, and first touch-detection threshold region 116 are shown from a side view (i.e., a cross section view) of touch screen 102 (as opposed to being shown from a top view, as in FIG. 1). Also, each of touch intensity signals 202A and 202B (and 302A and 302B) comprise a plot of signals received via a plurality of touch sensors 104 (e.g., a line or row of touch sensors 104 in any direction across touch screen 102). The variation in magnitude of the touch intensity signals may indicate signal levels induced by a conductive touch to the touch screen. Moreover, the variation in magnitudes of touch intensity signals 202A and 202B (and 302A and 302B), may indicate a cross section view of a deformation in touch screen 102 caused by a forceful touch, such as a palm and/or arm touch, to touch screen 102. The signal magnitude caused by the deformation of the touch screen may be in addition to the conductive touch related signal, and may come from the same or additional sensors around the conductive touch. Touch intensity signals 202A and 202B (and 302A and 302B) each comprise a plot of the magnitude of received signals strengths from a plurality of touch sensors 104. Points along a line of the touch intensity signals may map to locations on the surface of touch screen 102. Although touch intensity signals 202A and 202B (and 302A and 302B) are shown in 2D plot, a 3D plot may be generated using touch intensity signals from an area of touch sensors 104 of touch screen 102. Touch sensing software of system 100 (described below) may be configured to detect unintended touched region 110 (e.g., a palm touch 110) based on the magnitude of the touch intensity signals compared to first touch-detection threshold 204, and the shape and/or size of the detected touch intensity signals.

Referring to FIGS. 2A and 2B, the magnitude of signal strengths from a line or row (in any direction) of touch sensors 104 may be plotted to arrive at touch intensity signals 202A or 202B. Moreover, a spatial pattern of the plot of the magnitude of touch detection signals (e.g., touch intensity signals 202A, 202B, 302A, or 302B) may indicate the deformation of touch screen 102 in the locations of the touch sensors 104 that contribute to the touch intensity signals. It can be seen that a screen deformation indicated by touch intensity signals 202A is narrower than a screen deformation indicated by touch intensity signals 202B. The width (i.e., spatial pattern) of the screen deformation may depend on the strength of a force imparted by a palm touch to touch screen 102. Since the screen deformation indicated by touch intensity signals 202A has steeper slope 220A than the screen deformation indicated by touch intensity signals 202B, with a smaller (less steep) slope 220B, touch intensity signals 202A may be caused by a lighter or weaker force palm touch than touch intensity signals 202B. The stronger force touch, as indicated by touch intensity signals 202B, may have caused the deformation of touch screen 102 to spread over a broader area with a gradual slope tending towards the area of the touch screen that is not deformed. Although only a single slope measurement 220A for touch intensity signal 202A, and a single slope measurement 220B for touch intensity signal 202B are shown in FIGS. 2A and 2B to characterize a deformation of touch screen 102, touch sensing software of system 100 (described below) may be configured to utilize multiple slope and/or form measurements, that may be taken at any suitable place of the touch intensity signals to characterize the form of received touch intensity signals from touch sensors 104, and thus characterize a deformation in touch screen 102.

Touch sensing software of system 100 may be configured to utilize first touch-detection threshold 204 to detect physical touches applied to touch screen 102 and determine unintended touch region. 110. For example, touch intensity signals from one or more touch sensors 104 may be compared to first touch-detection threshold 204. When the touch intensity signal magnitudes cross first touch-detection threshold 204, touch sensing software of system 100 may be configured to determine that a physical touch has been detected on touch screen 102 in the location of particular touch sensors 104 that detected the signals that crossed first touch-detection threshold 204. Although, in FIGS. 2A and 2B (and in FIGS. 3A and 3B) touch intensity signals are shown increasing in a negative direction to cross first touch-detection threshold 204, in some embodiments, the touch intensity signals may have the opposite polarity and increase in a positive direction to cross first-touch detection threshold 204. In other words, touch intensity signals 202A and 202B (and 302A and 302B) represent signal magnitudes and may cross first touch detection threshold in a positive or negative direction to indicate a physical touch occurred, depending on the design of system 100.

Although touch intensity signals 202A and 202B (and 302A and 302B) are shown as smooth lines, the enlarged section "A," including a detail of FIG. 2B, shows that the touch intensity signals (as represented by touch intensity signal 202B in section A) may actually carry noise. In addition to other types of noise, the noise in the touch intensity signals may be caused by deformation of touch screen 102 where a portion of touch sensors 104 may be pushed too close to the ground plane in the stack of the touch screen 102 (not shown). As can be seen in section A, of FIG. 2B, noise on a touch intensity signal such as signal near the unintended touch region 110 may cross first touch-detection threshold 204 several times, which may trigger false touch detection signals (i.e., ghost touches) outside of the area of physical contact with touch screen 102 (e.g., outside of unintended touch region 110). These false touch detection signals may be more prevalent and cover a wider region around unintended touch region 110 when a touch with greater force is applied to touch screen 102 causing a wide deformation area with a shallow slope, as indicated by the gradual slope 220B and/or broad shape of touch intensity signals 202B. In comparison, touch intensity signals 202A with a steeper slope 220A may be caused by a lighter force touch. A region of false touches around unintended touch region 110 corresponding to touch intensity signals 202A may be much narrower than the region of false touches around unintended touch region 110 caused by the more forceful touch indicated by touch intensity signals 202B. Where an even lighter physical touch is applied to screen 102 (e.g., a finger touch, a stylus touch, or a light palm touch) the touch sensing software of system 100 may detect a strong signal that crosses first touch detection threshold 204, and identify a user's input to a software application. However, the more gentle screen touch may not cause screen 102 to deform, and ghost touches may not be a introduced by the lighter touch.

In other words, touch screen 102 deformation exists when the a screen touch (e.g., unintended touch 110 or any contact with the screen) is applied forcefully enough to cause the bending of touch screen 102 glass (e.g., the touch display module). If a touch is lightly applied then there may be no bending and the edges of the detected touched region may not be affected by false touch signals. Touch screen deformation occurs when enough pressure is applied to touch screen 102 to cause one or more touch sensor 104 to gain proximity to the ground plane (not shown) and thus induce false touch signals. The difference between a pure touch (without pressure) and screen deformation is indicated by the bending of the deformed glass that occurs in a spatial pattern that radiates from the place where the force is applied and may induce an elongated, tailing-off signal around the place where the force is applied. On the other hand, a screen touch applied with a light pressure would have a fairly acute cutoff of signal around the contact area of the applied touch. The difference between signals having a spatial pattern including an elongated tail-off and signals having a spatial pattern including a more acute cutoff, allows system 100 to distinguish between a touch signal caused by an electrical conducting contact with touch screen 102 (e.g., human touch) and signal magnitudes (or amplitudes) caused by deformation of touch screen 102 and touch sensors being pushed close to the ground plane.

In order to mitigate false touch detection signals in touch screen 102 around physical screen touches that are applied with a high enough force to deform screen 102, touch sensing software of system 100 may be configured to dynamically determine a second touch detection threshold 206 as shown in FIG. 2A or second touch detection threshold 208 as shown in FIG. 2B. The second touch-detection thresholds may be assigned to dynamic touch-detection threshold region 112 in touch screen 102, which may be located in a first perimeter region surrounding the unintended touch region 110. In order to trigger a detected touch within dynamic touch-detection threshold region 112, touch intensity signals 202A or 202B must cross second touch detection threshold 206 or 208, respectively. As shown in FIGS. 2A and 2B, the constant second touch-detection thresholds 206 and 208 are both lower than first touch-detection threshold 204, or more generally, further from a reference level such as a zero magnitude touch detection signal. Moving the touch detection threshold away from zero magnitude, in this manner, provides a signal margin such that noise peaks in touch intensity signals 202A and 202B must have a greater magnitude in order to cross second touch-detection thresholds 206 and 208 respectively, and therefore, are less likely to trigger false touch detection signals. However, a true physical touch in dynamic touch-detection region 112 (e.g., even a gentle touch) may trigger a touch-detection signal that is strong enough to cross the second touch-detection threshold. Therefore, the constant valued second touch-detection thresholds 206 and 208 that are utilized in the first perimeter region (e.g., dynamic touch-detection region 112) surrounding the unintended touch region 110 (e.g., a palm touch region), mitigate false touches while allowing detection of a user's intended touches within the same first perimeter region. Thereby, there is no need for a large rejection region (i.e., blanking area) surrounding a palm touch. In some embodiments, the width of dynamic touch-detection threshold region 112 may extend from the perimeter of unintended touch region 110 toward the outer perimeter of screen deformation in touch screen 102, as indicated by touch detection signal magnitudes moving close to the reference level (e.g., zero magnitude touch detection signal level).

In some embodiments, second touch-detection threshold 206 and/or second touch-detection threshold 208 may each be a constant values over the dynamic touch-detection threshold region 112. However, in some embodiments, second touch-detection threshold 206 and/or second touch-detection threshold 208 may each vary over dynamic touch-detection threshold region 112 (as described below with respect to FIGS. 3A and 3B). By applying a second touch-detection threshold in this manner, (e.g., rather than blocking an area of a large specified width around a palm touch from detecting any screen touches), the blanking area may be reduced in some proportion to the area and strength of the interference to touch sensors 104 caused by the higher force touch (e.g., a strong palm touch).

Outside of dynamic touch-detection threshold region 112, for example, in first touch-detection region 116, touch sensing software of system 100 may be configured to utilize a crossing of first touch-detection threshold 204 (or another specified threshold level) to detect a physical touch in touch screen 102. In some embodiments, first touch-detection threshold region 116 may correspond to the area of touch screen 102 that is not deformed by the touch that triggered detection of unintended touch region 110. First touch-detection threshold region 116 may also be applied with respect to FIGS. 3A and 3B.

In some embodiments, a second perimeter region located between unintended touch region 110 and dynamic touch-detection threshold region 112 may be designated as touch rejection region 114. Touch rejection region 114 may comprise a specified width where any level of touch intensity signals 202A or 202B are ignored. Touch rejection region 114 may also be applied with respect to FIGS. 3A and 3B.

Moreover, in some embodiments, touch sensing software of system 100 may be configured to utilize a hysteresis threshold level(s) (not shown) to determine a non-touched state at one or more of touch sensors 104 after a touched state has been determined. The hysteresis threshold level(s) may be closer to the reference level (e.g., closer to zero magnitude touch signal) than one or both of the first touch-detection threshold 204 and the second touch detection threshold (e.g. second touch detection threshold 206, 208, 306, or 310). For example, once the magnitude of a touch intensity signal increases and crosses first touch-detection threshold 204, it triggers a "touched" state. The magnitude of the touch intensity signal must decrease below the hysteresis threshold level before the "touched" state is removed from the corresponding touch sensors 104. At times, additional dynamic noise may be introduced into the touch intensity signals. By implementing hysteresis measures, robustness is added to maintaining an intended touch and building margin to reject noise from a recently removed intentional touch The hysteresis threshold may also be applied with respect to FIGS. 3A and 3B.

Embodiments for generating a dynamic touch-detection threshold may be implemented in various ways. For example, FIGS. 3A and 3B each include a schematic diagram of detected touch sensor signals and a dynamic touch detection threshold region relative to a cross section of the touch screen of system 100 in FIG. 1, according to an example embodiment.

As shown in FIGS. 3A and 3B, system 100 includes unintended touch region 110, dynamic touch-detection threshold region 112, rejection region 114, first touch-detection threshold region 116, and a first touch-detection threshold 204. FIG. 3A also includes touch intensity signals 302A, threshold offsets 304, a second touch-detection threshold 306, and a touch intensity signal slope 320A. FIG. 3B includes touch intensity signals 302B, threshold offsets 308, a second touch-detection threshold 310, and a touch intensity signal slope 320B.

As described above, unintended touch region 110, dynamic touch-detection threshold region 112, rejection region 114, and first touch-detection threshold region 116 are shown from a side view, or a cross section view of touch screen 102. Also, each of touch intensity signals 302A and 302B may be received via a one or more touch sensors 104 (e.g., a line or row of touch sensors 104 in any direction in touch screen 102). Moreover, each of the touch intensity signals 302A and 302B, (i.e., the magnitudes of one or more touch-detection signals) may indicate signal levels induced by a conductive touch to the touch screen and signal levels introduced by deformation of touch screen 102 that may be caused by a forceful palm and/or arm touch to touch screen 102. In this regard, the deformation of touch screen 102 may move touch sensors closer to the ground plane (not shown). The signal magnitude caused by the deformation of the touch screen may be in addition to the conductive touch related signal magnitude, and may come from the same or additional sensors relative to those detecting the conductive touch.

Referring to FIG. 3A, as described above, touch intensity signals 302A comprises a 2D plot of the magnitude of received signals strengths from a plurality of touch sensors 104. Points along the line of touch intensity signals 302A may map to locations on the surface of touch screen 102 corresponding to the position of underlying touch sensors 104 that detected the touch intensity signals. Although touch intensity signals 302A are shown in 2D plot, a 3D plot may be generated using touch intensity signals from touch sensors 104 located in an area of touch screen 102.

Touch sensing software of system 100 may be configured to detect unintended touched region 110 (e.g., a palm touch 110) based on touch intensity signals 302A and first touch-detection threshold 204. For example, a touched region may be defined where touch sensors 104 detect touch intensity signals that cross first touch-detection threshold 204. The touched region may be designated as an unintended touch region 110 based on the size, shape, and/or slope of the touched region. Touch sensing software of system 100 may be configured to dynamically assign second touch detection threshold 306 values to a first perimeter region (e.g., dynamic touch-detection threshold region 112) surrounding unintended touch region 110. As shown in FIG. 3A, second touch-detection threshold 306 values may vary over dynamic touch-detection threshold region 112. The value of a touch-detection threshold for a particular touch sensor 104 may depend on the location of the touch sensor in the dynamic touch-detection threshold region 112. The value(s) of second touch-detection threshold 306 may be based on characteristics (e.g., 2D or 3D contour characteristics) of touch intensity signals 302A, and/or the deformation of touch screen 102 as indicated by touch intensity signals 302A. For example, touch sensing software of system 100 may be configured to utilize slope 320A, or multiple slope measurements taken at any suitable place of touch intensity signal 302A (i.e., at any point of a deformation of touch screen 102), or other types of measurements or calculations, to determine the value(s) of second touch-detection threshold 306. As shown in FIG. 3A, second touch-detection threshold 306 may follow the form of touch intensity signal 302A. As the magnitude of second touch-detection threshold 306 is further from a reference value (e.g., a magnitude of zero) than first touch-detection threshold 204, second touch-detection threshold 306 provides a margin where noise on touch intensity signal 302A might otherwise trigger false detected touch signals (as shown for touch intensity signal 202B in section A of FIG. 2B). However, intended physical touches received within dynamic threshold region 112 may induce a signal strength great enough to cross second touch-detection threshold 306 such that a greater area of touch screen 102, outside of oversize touched region 110, may be available for receiving intended touch input to a software application.

In some embodiments, second touch-detection threshold 306 may be determined based on an adjustment of first touch detection threshold 204, for example, by modifying first touch detection threshold by one or more offsets 306. Offsets 306 may be determined based on characteristics (e.g., 2D or 3D contour) of touch intensity signal 302A, and/or the deformation of touch screen 102 as indicated by touch intensity signals 302A. In some embodiments, the magnitude of the offsets 306 may mirror the behavior of touch intensity 302A, however, the relationship may not be linear and may have a sloping factor applied.

Referring to FIG. 3B, as indicated by the shape of touch intensity signals 302B, a corresponding deformation in touch screen 102 may comprise an irregular or asymmetric 2D and/or 3D contour. Second touch-detection threshold 310, which is applied within dynamic touch-detection threshold region 112, may be determined in a similar or substantially the same method as above for determining second touch-detection threshold 306. For example, once unintended touch region 110 is determined based on first touch threshold 204 and the size, shape, and/or slope of touch intensity signals 302B, touch sensing software of system 100 may be configured to dynamically assign second touch detection threshold 310 to a first perimeter region surrounding unintended touch region 110 (e.g., dynamic touch-detection threshold region 112). As shown in FIG. 3B, second touch-detection threshold 310 may vary over dynamic touch-detection threshold region 112. The values of second touch-detection threshold 310 may be based on characteristics of touch intensity signals 302B, and/or the deformation of touch screen 102 as indicated by touch intensity signals 302B. For example, touch sensing software of system 100 may be configured to utilize slope 320B, or multiple slope and/or gradient measurements taken at any suitable place of touch intensity signal 302B (i.e., at any point of a deformation of touch screen 102), or other types of measurements or calculations for determining the values of second touch-detection threshold 310. As shown in FIG. 3B, second touch-detection threshold 310 may follow the irregular form of touch intensity signal 302B, thereby providing a margin where noise on touch intensity signal 302B might otherwise trigger false detected touch signals (as shown for touch intensity signal 202B in section A of FIG. 2B). However, intended physical touches received within dynamic touch-detection threshold region 112 may induce a signal strength great enough to cross second touch-detection threshold 310 such that a greater area of touch screen 102, outside of oversize touched region 110, may be available to detect intended touch input to a software application. By modifying the second touch-detection thresholds 306 and 308 according to the slope of the touch intensity signals and/or the contour of deformation of touch screen 102 (as indicated by the touch intensity signals) the margin created by the offset at any point along the second threshold line may provide enough room for mitigating the detection of false signals, while increasing the likelihood of detecting intended signals.

In some embodiments, second touch-detection threshold 310 may be determined based on an adjustment of first touch detection threshold 204, for example, by modifying first touch detection threshold 204 by one or more offsets 308. Offsets 308 may be determined based on characteristics (e.g., 2D or 3D contour characteristics) of irregular shaped touch intensity signal 302B, and/or the irregular deformation of touch screen 102 as indicated by touch intensity signals 302B.

Embodiments for generating a dynamic touch-detection threshold may be implemented in various ways. For example, FIG. 4 is a block diagram of system 100 configured to detect an unintended touched region in a touch screen based on a first touch-detection threshold, and dynamically generate a second touch-detection threshold for a perimeter region surrounding the unintended touched region, according to an example embodiment.

Figure 4:
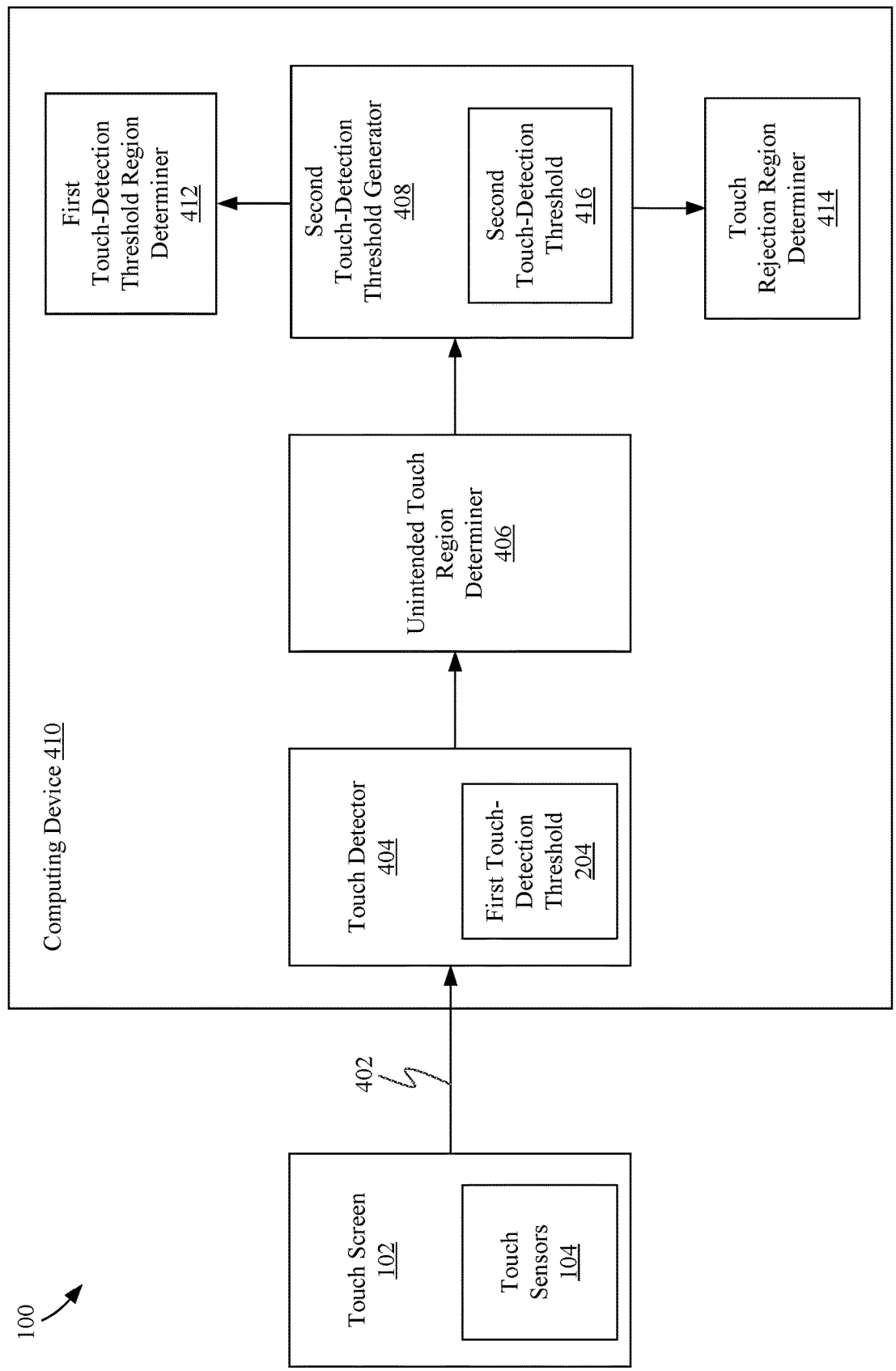
FIG. 4 is a block diagram of a system configured to detect an unintended touched region on a touch screen based on a first touch-detection threshold, and dynamically generate a second touch-detection threshold for a perimeter region surrounding the unintended touched region, according to an example embodiment.

As shown in FIG. 4, system 100 includes touch screen 102, touch sensors 104, touch intensity signals 402, computing device 410, touch detector 404, first touch-detection threshold 204, unintended touch region determiner 406, second touch-detection threshold generator 408, second touch-detection threshold 416, first touch-detection threshold region determiner 412, and touch rejection region determiner 414.

Referring to FIG. 4, computing device 410 may be communicatively coupled to touch screen 102 and touch sensors 104, and/or may be integrated within computing device 410. Computing device 410 may comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

Computing device 410 may include touch sensing software of system 100 (e.g., touch controller software) comprising one or more of touch detector 404, unintended touch region determiner 406, second touch-detection threshold generator 408, first touch-detection threshold region determiner 412, and touch rejection region determiner 414.

Touch intensity signals 402 may comprise any one of touch intensity signals 202A, 202B, 302A, or 302B, and second touch-detection threshold 416 may comprise a respective corresponding one of second touch-detection thresholds 206, 208, 306, or 310, as described above with respect to FIGS. 2A, 2B, 3A, and 3B. Touch intensity signals 402 may comprise signals from a one or more of touch sensors 104. As described above, points on a plot of touch intensity signals 402 map to locations on touch screen 102 where corresponding touch sensors 104 that detected the touch intensity signals are located. The magnitude of touch intensity signals 402 (as shown in FIGS. 2A, 2B, 3A, and 3B with respect to touch intensity signals 202A, 202B, 302A, or 302B) may indicate an unintended touch area and depth of deformation of touch screen 102 at the locations of touch sensors 104.

Touch detector 404 may be configured to receive touch intensity signals 402 from one or more touch sensors 104 of touch screen 102. Touch intensity signals 402 may indicate the magnitude of touch signals from one or more touch sensors 104 caused by a conductive touch and/or deformation of touch screen 102. Touch intensity signals 402 may also indicate characteristics of a deformation in touch screen 102 including depth of deformation, and may provide 2D and/or 3D information regarding the characteristics of deformation. Touch detector 404 may be configured to detect a touched region of touch screen 102 by comparing the magnitude of touch intensity signals 402 to first touch-detection threshold 204. The touched region may be located in an area of touch screen 102 where one or more of the touch sensors 104 detected touch intensity signals 402 with a magnitude that crossed first touch-detection threshold 204.

Unintended touch region determiner 406 may be configured to analyze touch intensity signals 402 to determine spatial characteristics (e.g., shape and/or size) of the touched region of touch screen 102, and determine whether the touched region is an unintended touched region 110. For example, unintended touch region determiner 406 may be configured to recognize an unintended touch region 110 based on spatial characteristics indicating a physical palm and/or an arm touch to touch screen 102. In some embodiments, a spatial pattern of magnitudes of touch intensity signals 402 may indicate a 3D deformation of touch screen 102. Unintended touch region determiner 406 may be configured to analyze length, width, depth, and/or slope (e.g., 2D and/or 3D aspects) at one or more places along a curve of touch intensity signal 402 (e.g., indicating a curve of a touch screen 102 deformation contour) to determine that touch screen 102 has been deformed, which may cause false touches around the unintended touch region 110. By determining that the spatial pattern of the magnitudes of touch intensity signals corresponds to the 3D deformation contour in touch screen 102 and the conductive touch signals, a second touch-detection threshold may be determined for mitigating false touches within the deformed region.

Second touch-detection threshold generator 408 may be configured to assign a second touch-detection threshold 416 (e.g., one of second touch-detection thresholds 206, 208, 306, or 310) to a first perimeter region of touch screen 102 (e.g., dynamic touch-detection threshold region 112), which surrounds the touched region (e.g., unintended touch region 110). The second touch-detection threshold 416 may be closer to a reference level such as zero magnitude of touch intensity signal 402 than first touch detection threshold 204. As described above, second touch-detection threshold 416 may comprise a constant value, or the threshold value may vary as applied to touch intensity signals 402 from different touch sensors 104. In some embodiments, the value of second touch-detection threshold 416 may vary within the first perimeter region (e.g., within dynamic touch-detection threshold region 112) proportionally with a slope of the touch intensity signals 402 or the corresponding deformation in touch screen 102. By varying the value of second touch-detection threshold 416 in this manner, the margin created by the threshold offsets, at any point of second touch-detection threshold 416, may provide enough room for mitigating the detection of false signals, because the variable second touch-detection threshold 416 moves closer to the reference (e.g., closer to zero magnitude touch intensity signal) and adjusts even closer where touch screen 102 deformation lessens. Also, relative to systems that apply a large rejection (or blanking) area to avoid false touch signals, the use of second touch-detection threshold 416 increases the dimensions of screen area available for detecting a user's intended signals. False signal mitigation and increased area for detecting intended signals are also achieved where second touch-detection threshold 416 is a constant value.

In some embodiments, second touch-detection threshold generator 408 is configured to dynamically adjust first touch-detection threshold 204 by one or more offset values (e.g., as in offsets 304 or offsets 308) that may be determined based on a slope of the touch intensity signals 402 (e.g., touch intensity signal slope 320A or slope 320B of touch intensity signal 302A or 302B). The one or more offset values may also be determined based on a corresponding contour of touch intensity signals 402 in the first perimeter region of touch screen 102 (e.g., dynamic touch-detection threshold region 112) to arrive at the second touch-detection threshold 416.

In some embodiments, first touch-detection threshold region determiner 412 may be configured to determine a region of touch screen 112 outside of unintended touch region 110 and the first perimeter region (e.g., outside of dynamic touch-detection threshold region 112), such as first touch-detection region 116, where touch detector 404 may be configured to utilize a crossing of first touch-detection threshold 204 (or another specified touch-detection threshold) to detect a physical touch. First touch-detection threshold region 116 may correspond to the area of touch screen 102 that is not deformed by the touch that triggered detection of unintended touch region 110. In this manner, the original touch sensitivity of touch screen 102 may be maintained outside of the deformed area of touch screen 102.

In some embodiments, touch rejection region determiner 414 may be configured to determine a second perimeter region (e.g., touch rejection region 114) located between unintended touch region 110 and dynamic touch-detection threshold region 112. Touch rejection region 114 may comprise a specified width where any level of touch intensity of touch intensity signals 402 are ignored. Touch rejection region 114 is optional, and if used, may be smaller than dynamic touch-detection threshold region 112.

Moreover, in some embodiments, touch detector 404 may be configured to utilize a hysteresis threshold level(s) (not shown) to determine a non-touched state at one or more of touch sensors 104 after a touched state has been determined. The hysteresis threshold level(s) may be closer to a reference level (e.g., closer to zero magnitude touch intensity signal 402) than first touch-detection threshold 204 and/or second touch-detection threshold 416. For example, once the magnitude of touch intensity signals 402 increases across first touch-detection threshold 204 and/or second touch-detection threshold 416 and activates a "touched" state in one or more touch sensors 104, the magnitude of touch intensity signals 402 must decrease below the hysteresis threshold level before the "touched" state is removed from the corresponding touch sensors 104.

Figure 5:
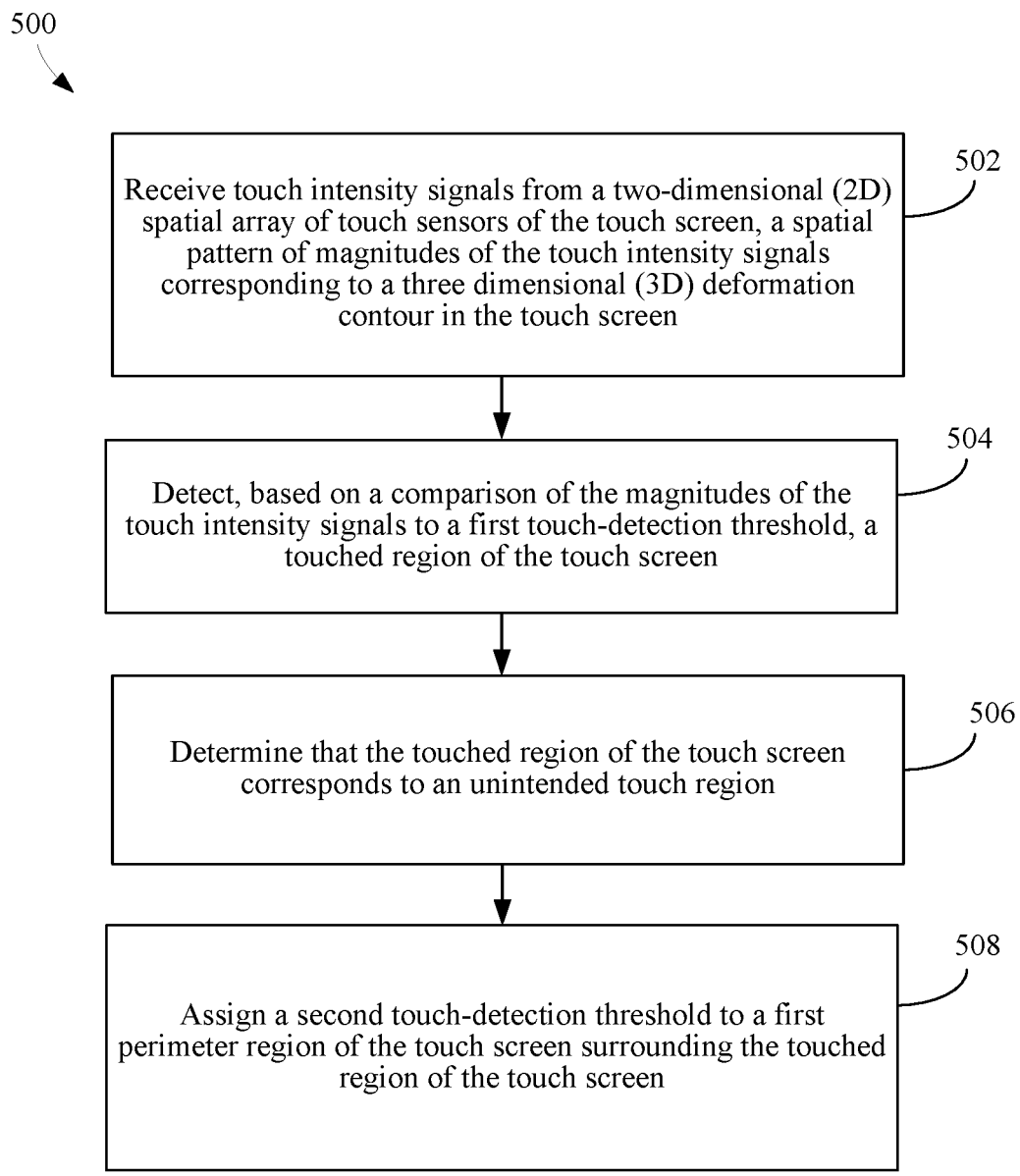
FIG. 5 is a flowchart of a method for detecting an unintended touched region of a touch screen based on a first touch-detection threshold, and dynamically generating a second touch-detection threshold for a perimeter region surrounding the touched region, according to an example embodiment.

In embodiments, system 100 may operate in various ways to perform its functions. For example, FIG. 5 is a flowchart of a method for detecting an unintended touched region of a touch screen based on a first touch-detection threshold and dynamically generating a second touch-detection threshold for a perimeter region surrounding the touched region, according to an example embodiment.

Flowchart 500 may be performed by computing device 410. For the purpose of illustration, flowchart 500 of FIG. 5 is described with reference to FIGS. 1, 2A-2B, 3A-3B, and 4. Flowchart 500 of FIG. 5 begins with step 502. In step 502, touch intensity signals may be received from a two-dimensional (2D) spatial array of touch sensors of the touch screen, where a spatial pattern of magnitudes of the touch intensity signals correspond to a three dimensional (3D) deformation contour in the touch screen. For example, touch intensity signals 402 may be received by touch detector 404 from touch sensors 104 of touch screen 102. A spatial pattern of magnitudes of touch intensity signals 402 may correspond to a 3D deformation contour in touch screen 102.

In step 504, based on a comparison of the magnitudes of the touch intensity signals to a first touch-detection threshold, a touched region of the touch screen is detected. For example, touch detector 404 may detect a touched region of touch screen 102 based on a comparison of the magnitudes of touch intensity signals 402 to first touch-detection threshold 204.

In step 506, it may be determined that the touched region of the touch screen corresponds to an unintended touch region. For example, unintended touch region determiner 406 may determine that the detected touch region of touch screen 102 corresponds to unintended touch region 110. In some embodiments, unintended touch region 110 may comprise a palm touch region 110.

In step 508, a second touch-detection threshold may be assigned to a first perimeter region of the touch screen surrounding the touched region of the touch screen. For example, second touch-detection threshold generator 408 may assign second touch-detection threshold 416 to a first perimeter region comprising dynamic touch-threshold region 112 of touch screen 102, where the first perimeter region surrounds the detected touch region (e.g., unintended touch region 110).

Figure 6:
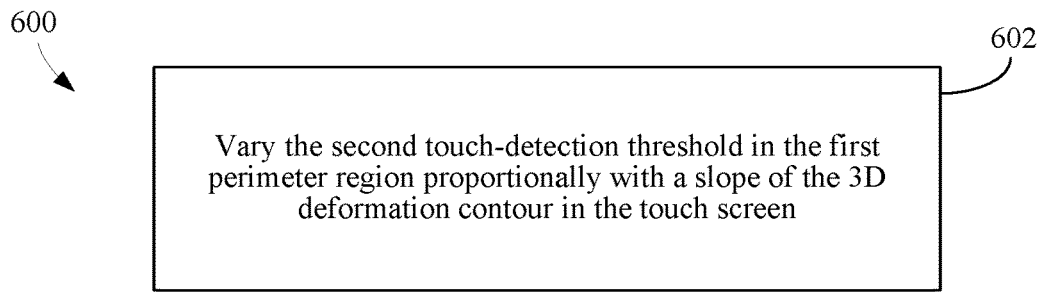
FIG. 6 is a flowchart of a method for dynamically generating a second touch-detection threshold that varies across touch sensors of a touch screen, according to an example embodiment.

In embodiments, system 100 may operate in various ways to perform its functions. For example, FIG. 6 is a flowchart 600 of a method for dynamically generating a second touch-detection threshold that varies across touch sensors of a touch screen, according to an example embodiment.

Flowchart 600 may be performed by computing device 410. For the purpose of illustration, flowchart 600 of FIG. 6 is described with reference to FIGS. 1, 2A-2B, 3A-3B, and 4. Flowchart 600 of FIG. 6 includes step 602. In step 602, the second touch-detection threshold is varied in the first perimeter region proportionally with a slope of the 3D deformation contour in the touch screen. For example, second touch-detection threshold 416 may vary in the first perimeter region (e.g., dynamic touch-detection threshold region 112) according to a slope of a 3D deformation contour of touch screen 102. The 3D deformation contour may be indicated by a spatial pattern of touch intensity signals 402 (e.g., a spatial pattern of one of touch intensity signals 202A, 202B, 302A, or 302B) and the slope may comprise, for example, one of touch intensity signal slopes 220A, 220B, 320A, 320B that correspond to touch intensity signals 202A, 202B, 302A, or 302B respectively.

Figure 7:
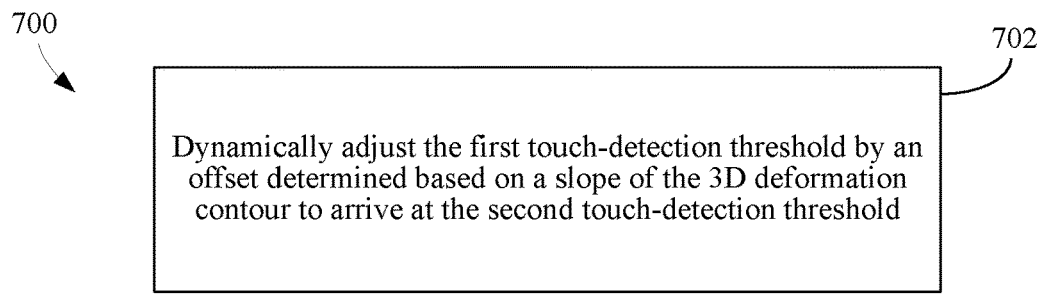
FIG. 7 is a flowchart of a method for dynamically generating a second touch-detection threshold that varies across touch sensors of a touch screen by adjusting the first touch-detection threshold, according to an example embodiment.

In embodiments, system 100 may operate in various ways to perform its functions. For instance, FIG. 7 is a flowchart 700 of a method for dynamically generating a second touch-detection threshold that varies across touch sensors of the touch screen by adjusting the first touch-detection threshold, according to an example embodiment.

Flowchart 700 may be performed by computing device 410. For the purpose of illustration, flowchart 700 of FIG. 7 is described with reference to FIGS. 1, 2A-2B, 3A-3B, and 4. Flowchart 700 of FIG. 7 includes step 702. In step 702, the first touch-detection threshold is dynamically adjusted by an offset that is determined based on a slope of the 3D deformation contour to arrive at the second touch-detection threshold. For example, second touch-detection threshold generator 408 may generate second touch detection threshold 416 that varies across touch sensors 104 of touch screen 102 by adjusting first touch detection threshold 204. In some embodiments, second touch-detection threshold generator 408 may dynamically adjust first touch-detection threshold 204 by an offset that may be determined based on a slope of the touch intensity signals 402 or the corresponding contour of deformation in the first perimeter region of touch screen 102, to arrive at the second touch-detection threshold 416. In some embodiments, second touch-detection threshold generator 408 may dynamically adjust first touch-detection threshold 204 by offset 304 or offset 308 that may be determined based on touch intensity signal slope 320A of touch intensity signal 302A or touch intensity signal slope 320B of touch intensity signal 302B, respectively. The offset may also be determined based on the corresponding contour of deformation in the first perimeter region of touch screen 102 (e.g., dynamic touch-detection region 112) to arrive at the second touch-detection threshold 416.

Figure 8:
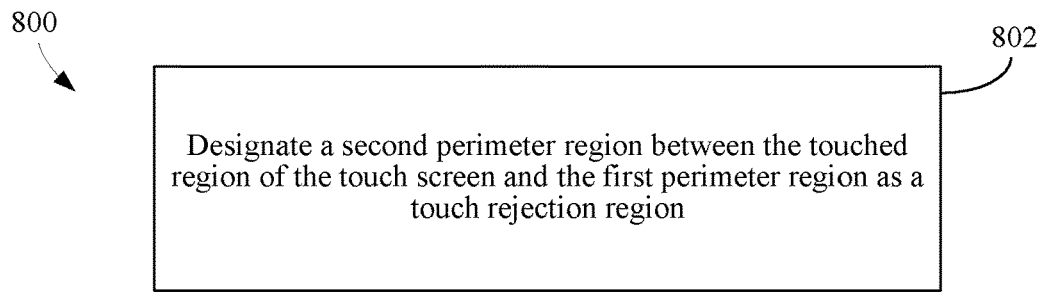
FIG. 8 is a flowchart of a method for designating a touch rejection region on a touch screen, according to an example embodiment.

In embodiments, system 100 may operate in various ways to perform its functions. For example, FIG. 8 is a flowchart 800 of a method for designating a touch rejection region on a touch screen, according to an example embodiment.

Flowchart 800 may be performed by computing device 410. For the purpose of illustration, flowchart 800 of FIG. 8 is described with reference to FIGS. 1, 2A-2B, 3A-3B, and 4. Flowchart 800 of FIG. 8 includes step 802. In step 802, a second perimeter region located between the touched region of the touch screen and the first perimeter region may be designated as a touch rejection region. For example, touch rejection region determiner 414 may designate a second perimeter region (e.g., touch rejection region 114) located between the touched region of touch screen 102 (e.g., unintended touched region 110) and the first perimeter region (e.g., dynamic touch-detection threshold region 112) as a touch rejection region. Rejection region 114 may comprise an optional fourth region on touch screen 102, and may comprise a rejection region of a specified dimension where touch signals are rejected or ignored regardless of the value of a touch-detection threshold. Rejection region 114 may be optional, and if utilized, may be smaller than dynamic touch-detection threshold region 112.

Figure 9:
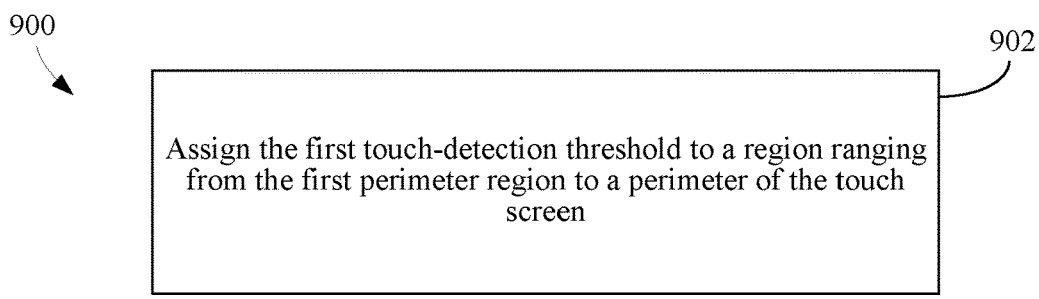
FIG. 9 is a flowchart of a method for assigning a touch detection threshold outside of a first perimeter region on a touch screen, according to an example embodiment.

In embodiments, system 100 may operate in various ways to perform its functions. For example, FIG. 9 is a flowchart 900 of a method for designating a touch rejection region on a touch screen, according to an example embodiment.

Flowchart 900 may be performed by computing device 410. For the purpose of illustration, flowchart 900 of FIG. 9 is described with reference to FIGS. 1, 2A-2B, 3A-3B, and 4. Flowchart 900 of FIG. 9 includes step 902. In step 902, the first touch-detection threshold may be assigned to a region ranging from the first perimeter region to a perimeter of the touch screen. For example, first touch-detection threshold region determiner 412 may assign first touch detection threshold 204 (or another touch detection threshold) to region 116 of touch screen 102, which ranges outward from the first perimeter region (e.g., dynamic touch-detection threshold region 112) to a perimeter of touch screen 102.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, FIGS. 2A-2B, FIGS. 3A-3B, and FIG. 4 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), a timing controller (TCON), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
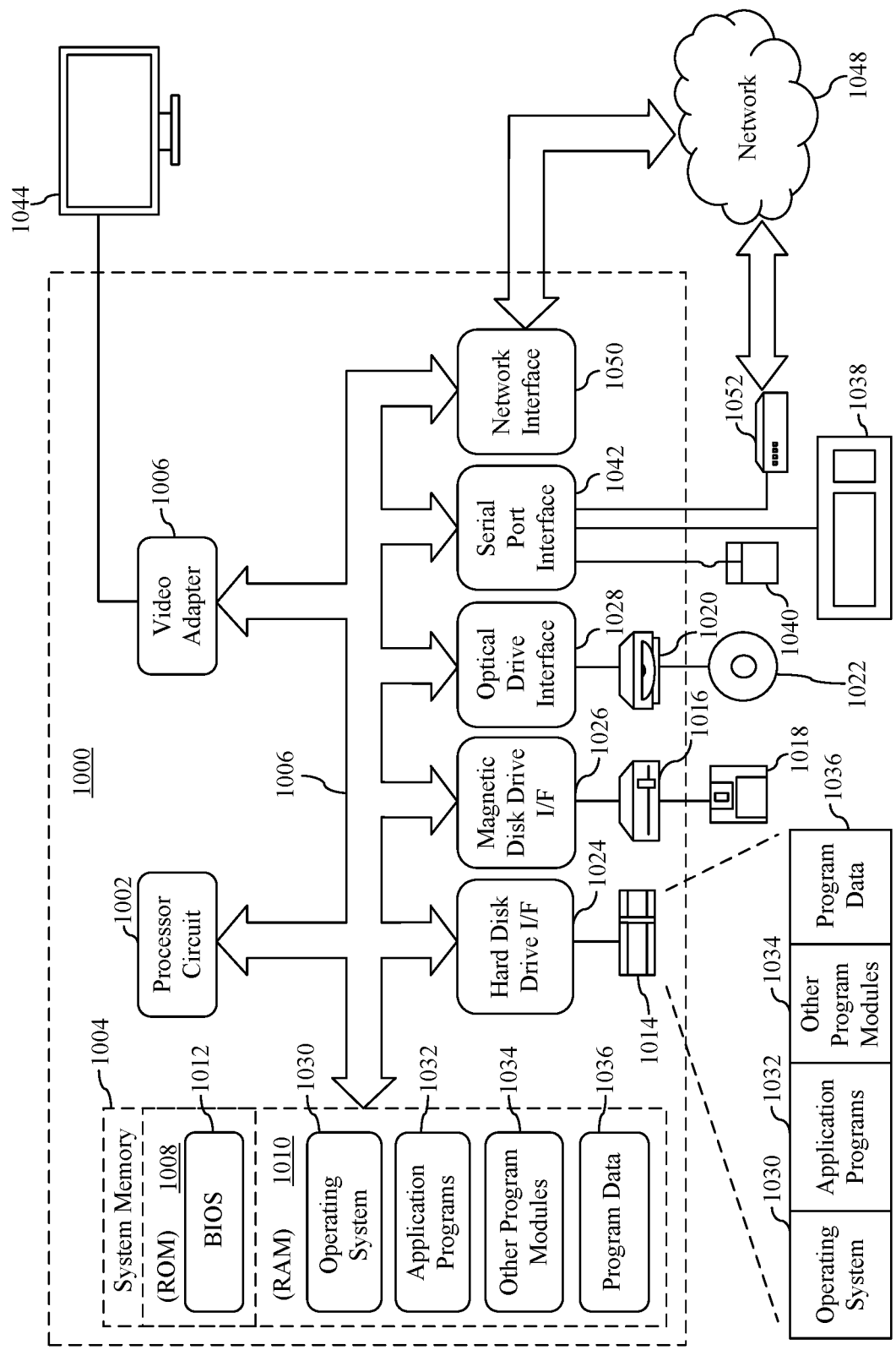
FIG. 10 is a block diagram of an example processor-based computer system that may be used to implement various embodiments.

FIG. 10 is a block diagram of an example processor-based computer system 1000 that may be used to implement various embodiments. Computing device 410 may include any type of computing device, mobile or stationary, such as a desktop computer, a server, a video game console, etc. For example, computing device 410 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Computing device 410, touch screen 102, and touch sensors 104, may each be implemented in one or more computing devices containing features similar to those of computing device 1000 in stationary or mobile computer embodiments and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing computing device 410, touch screen 102, touch sensors 104, touch detector 404, unintended touch region determiner 406, second touch-detection threshold generator 408, first touch detection threshold region determiner 412, touch rejection region determiner 414, flowchart 500, flowchart 600, flowchart 700, flowchart 800, flowchart 900, and/or further embodiments described herein. Program data 1036 may include unintended touch region 110, dynamic touch-detection threshold region 112, first touch-detection threshold region 116, rejection region 114, first touch-detection threshold 204, touch intensity signals 202A, second touch-detection threshold 206, touch intensity signal slope 220A, touch intensity signals 202B, second touch-detection threshold 208, touch intensity signal slope 220B, touch intensity signals 302A, threshold offsets 304, second touch-detection threshold 306, touch intensity signal slope 320A, touch intensity signals 302B, threshold offsets 308, second touch-detection threshold 310, touch intensity signal slope 320B, and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a method in a device that has a touch screen comprises receiving touch intensity signals from a two-dimensional (2D) spatial array of touch sensors of the touch screen, a spatial pattern of magnitudes of the touch intensity signals corresponding to at least a three-dimensional (3D) deformation contour in the touch screen. Based on a comparison of the magnitudes of the touch intensity signals to a first touch-detection threshold, a touched region of the touch screen is detected. It is determined that the touched region of the touch screen corresponds to an unintended touched region and a second touch-detection threshold is assigned to a first perimeter region of the touch screen surrounding the touched region of the touch screen.

In an embodiment of the foregoing method, the spatial pattern of magnitudes of the touch intensity signals corresponding to the 3D deformation contour in the touch screen is determined based on analysis of at least a slope of the touch intensity signals.

In an embodiment of the foregoing method, the unintended touched region corresponds to a detected palm touch.

In an embodiment of the foregoing method, the second touch-detection threshold is a constant value.

In an embodiment of the foregoing method, the second touch-detection threshold is variable over the first perimeter region of the touch screen.

In an embodiment of the foregoing method, the second touch-detection threshold varies in the first perimeter region proportionally with a slope of the touch intensity signals from the first perimeter region of the touch screen.

In an embodiment of the foregoing method, the method further comprises dynamically adjusting the first touch-detection threshold by an offset determined based on a slope of the touch intensity signals from the first perimeter region of the touch screen to arrive at the second touch-detection threshold.

In an embodiment of the foregoing method, the method further comprises designating a second perimeter region between the touched region of the touch screen and the first perimeter region as a touch rejection region.

In an embodiment of the foregoing method, the method further comprises assigning the first touch-detection threshold to a region ranging from the first perimeter region to a perimeter of the touch screen.

In an embodiment, a system in a device that has a touch screen comprises a touch detector that is configured to: receive touch intensity signals from a two-dimensional (2D) spatial array of touch sensors of the touch screen, where magnitudes of the touch intensity signals correspond to at least a three-dimensional (3D) deformation contour in the touch screen, and detect, based on a comparison of the magnitudes of the touch intensity signals to a first touch-detection threshold, a touched region of the touch screen. An unintended touch region determiner is configured to determine that the touched region of the touch screen corresponds to an unintended touched region. A second touch-detection threshold generator is configured to assign a second touch-detection threshold to a first perimeter region of the touch screen surrounding the touched region of the touch screen.

In an embodiment of the foregoing system, the unintended touch region determiner is configured to determine that the spatial pattern of magnitudes of the touch intensity signals correspond to the 3D deformation contour in the touch screen based on analysis of at least a slope of the touch intensity signals.

In an embodiment of the foregoing system, the unintended touched region corresponds to a detected palm touch.

In an embodiment of the foregoing system, the second touch-detection threshold is a constant value.

In an embodiment of the foregoing system, the second touch-detection threshold is variable over the first perimeter region of the touch screen.

In an embodiment of the foregoing system, the second touch-detection threshold varies in the first perimeter region proportionally with a slope of the touch intensity signals from the first perimeter region of the touch screen.

In an embodiment of the foregoing system, the second touch-detection threshold generator is further configured to dynamically adjust the first touch-detection threshold by an offset determined based on a slope of the touch intensity signals from the first perimeter region of the touch screen to arrive at the second touch-detection threshold.

In an embodiment of the foregoing system, the system further comprises a touch rejection region determiner configured to designate a second perimeter region between the touched region of the touch screen and the first perimeter region as a touch rejection region.

In an embodiment of the foregoing system, the system further comprises a first touch-detection threshold region generator configured to assign the first touch-detection threshold to a region ranging from first perimeter region to a perimeter of the touch screen.

In an embodiment, a computer-readable medium having program code recorded thereon that when executed by at least one processor causes the at least one processor to perform a method. The method comprises receiving touch intensity signals from a two-dimensional (2D) spatial array of touch sensors of a touch screen, where magnitudes of the touch intensity signals correspond to at least a three-dimensional (3D) deformation contour in the touch screen. Based on a comparison of the magnitudes of the touch intensity signals to a first touch-detection threshold, a touched region of the touch screen is detected. It is determined that the touched region of the touch screen corresponds to an unintended touched region, and a second touch-detection threshold is assigned to a first perimeter region of the touch screen surrounding the touched region of the touch screen.

In an embodiment of the foregoing computer readable medium, the method further comprises dynamically adjusting the first touch-detection threshold by an offset determined based on a slope of the touch intensity signals from the first perimeter region of the touch screen to arrive at the second touch-detection threshold.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A method in a device that has a touch screen, the method comprising:
   receiving first touch intensity signals from a two-dimensional (2D) spatial array of touch sensors of the touch screen, a spatial pattern of magnitudes of the first touch intensity signals corresponding to at least a three-dimensional (3D) deformation contour in the touch screen;
   detecting, based on a comparison of the magnitudes of the first touch intensity signals to a first touch-detection threshold, a touched region of the touch screen; and
   in response to determining that the touched region of the touch screen corresponds to an unintended touched region:
      assigning a second touch-detection threshold to a first perimeter region surrounding the unintended touched region of the touch screen,
      wherein the second touch-detection threshold corresponds to a greater magnitude touch intensity signal than a magnitude of touch intensity signal corresponding to the first touch detection threshold, and
      wherein second touch intensity signals received in the first perimeter region are detectable based on the second touch-detection threshold and the first perimeter region surrounding the unintended touched region corresponds to a reduced touch sensitivity relative to the unintended touched region of the touch screen.

2. The method of claim 1, wherein the spatial pattern of magnitudes of the first touch intensity signals corresponding to the 3D deformation contour in the touch screen is determined based on analysis of at least a slope of the touch intensity signals.

3. The method of claim 1, wherein the unintended touched region corresponds to a detected palm touch.

4. The method of claim 1, wherein the second touch-detection threshold is a constant value.

5. The method of claim 1, wherein the second touch-detection threshold is variable over the first perimeter region of the touch screen.

6. The method of claim 1, wherein the second touch-detection threshold varies in the first perimeter region proportionally with a slope of the first touch intensity signals from the first perimeter region of the touch screen.

7. The method of claim 1, further comprising:
   dynamically adjusting the first touch-detection threshold by an offset determined based on a slope of the first touch intensity signals from the first perimeter region of the touch screen to arrive at the second touch-detection threshold.

8. The method of claim 1, further comprising:
   designating a second perimeter region between the unintended touched region of the touch screen and the first perimeter region as a touch rejection region.

9. The method of claim 1, further comprising:
   assigning the first touch-detection threshold to a region ranging from the first perimeter region to a perimeter of the touch screen.

10. A system in a device that has a touch screen, the system comprising:
    one or more processors; and
    one or more memory devices that store program code of a first computer program to be executed by the one or more processors, the program code configured to:
       receive first touch intensity signals from a two-dimensional (2D) spatial array of touch sensors of the touch screen, magnitudes of the first touch intensity signals corresponding to at least a three-dimensional (3D) deformation contour in the touch screen;
       detect, based on a comparison of the magnitudes of the first touch intensity signals to a first touch-detection threshold, a touched region of the touch screen;
       determine that the touched region of the touch screen corresponds to an unintended touched region; and
       in response to the touched region corresponding to the unintended touched region, assign a second touch-detection threshold to a first perimeter region surrounding the unintended touched region of the touch screen,
       wherein the second touch-detection threshold corresponds to a greater magnitude touch intensity signal than a magnitude of touch intensity signal corresponding to the first touch detection threshold, and
       wherein second touch intensity signals received in the first perimeter region are detectable based on the second touch-detection threshold and the first perimeter region surrounding the unintended touched region corresponds to a reduced touch sensitivity relative to the unintended touched region of the touch screen.

11. The system of claim 10, wherein the program code is further configured to determine that the spatial pattern of magnitudes of the first touch intensity signals corresponds to the 3D deformation contour in the touch screen based on analysis of at least a slope of the first touch intensity signals.

12. The system of claim 10, wherein the unintended touched region corresponds to a detected palm touch.

13. The system of claim 10, wherein the second touch-detection threshold is a constant value.

14. The system of claim 10, wherein the second touch-detection threshold is variable over the first perimeter region of the touch screen.

15. The system of claim 10, wherein the second touch-detection threshold varies in the first perimeter region proportionally with a slope of the first touch intensity signals from the first perimeter region of the touch screen.

16. The system of claim 10, wherein the program code is further configured to:

dynamically adjust the first touch-detection threshold by an offset determined based on a slope of the first touch intensity signals from the first perimeter region of the touch screen to arrive at the second touch-detection threshold.

17. The system of claim 10, wherein the program code is further configured to:
  designate a second perimeter region between the unintended touched region of the touch screen and the first perimeter region as a touch rejection region.

18. The system of claim 10, wherein the program code is further configured to:
  assign the first touch-detection threshold to a region ranging from first perimeter region to a perimeter of the touch screen.

19. A computer-readable hardware device having program code recorded thereon that when executed by at least one processor causes the at least one processor to perform a method, the method comprising:
  receiving first touch intensity signals from a two-dimensional (2D) spatial array of touch sensors of a touch screen, magnitudes of the first touch intensity signals corresponding to at least a three-dimensional (3D) deformation contour in the touch screen;
  detecting, based on a comparison of the magnitudes of the first touch intensity signals to a first touch-detection threshold, a touched region of the touch screen; and
  in response to determining that the touched region of the touch screen corresponds to an unintended touched region:
    assigning a second touch-detection threshold to a first perimeter region surrounding the unintended touched region of the touch screen,
    wherein the second touch-detection threshold corresponds to a greater magnitude touch intensity signal than a magnitude of touch intensity signal corresponding to the first touch detection threshold, and
    wherein second touch intensity signals received in the first perimeter region are detectable based on the second touch-detection threshold and the first perimeter region surrounding the unintended touched region corresponds to a reduced touch sensitivity relative to the unintended touched region of the touch screen.

20. The computer readable hardware device of claim 19, wherein the method further comprises dynamically adjusting the first touch-detection threshold by an offset determined based on a slope of the first touch intensity signals from the first perimeter region of the touch screen to arrive at the second touch-detection threshold.

* * * * *